(12) United States Patent
Bruno

(10) Patent No.: US 6,795,284 B2
(45) Date of Patent: Sep. 21, 2004

(54) DEVICE FOR STOPPING A SINGLE-PHASE ASYNCHRONOUS MOTOR WITH PHASE-SHIFTING CAPACITOR

(75) Inventor: Serge Bruno, Marnaz (FR)

(73) Assignee: Somfy, Cluses (FR)

( * ) Notice: Subject to any disclaimer, the term of this patent is extended or adjusted under 35 U.S.C. 154(b) by 185 days.

(21) Appl. No.: 10/239,016

(22) PCT Filed: Mar. 23, 2001

(86) PCT No.: PCT/IB01/00494

§ 371 (c)(1),
(2), (4) Date: Sep. 17, 2002

(87) PCT Pub. No.: WO01/73913

PCT Pub. Date: Oct. 4, 2001

(65) Prior Publication Data

US 2003/0030950 A1 Feb. 13, 2003

(30) Foreign Application Priority Data

Mar. 27, 2000 (FR) .......................................... 00 03853

(51) Int. Cl.⁷ .............................................. H02H 5/04
(52) U.S. Cl. ......................................... 361/23; 318/430
(58) Field of Search ............................. 361/22–23, 51; 318/466, 430, 774; 340/648

(56) References Cited

U.S. PATENT DOCUMENTS

| | | | |
|---|---|---|---|
| 4,722,019 A | 1/1988 | Pohl | |
| 5,705,903 A | * 1/1998 | Hastings | 318/370 |
| 5,760,566 A | * 6/1998 | Nassr et al. | 318/774 |
| 5,850,131 A | * 12/1998 | Wolfer et al. | 318/466 |
| 6,104,156 A | * 8/2000 | Bruno | 318/434 |

FOREIGN PATENT DOCUMENTS

| | | |
|---|---|---|
| DE | 42 11 495 A | 3/1993 |
| EP | 0 408 493 A | 1/1991 |
| EP | 0 551 053 A | 7/1993 |
| FR | 2 649 260 A | 1/1991 |

OTHER PUBLICATIONS

International Search Report in SN PCT/IB 01/00494.

* cited by examiner

Primary Examiner—Gregory J. Toatley, Jr.
Assistant Examiner—Boris Benenson
(74) Attorney, Agent, or Firm—Bugnion S.A.; John Moetteli

(57) ABSTRACT

The invention concerns a device for stopping the motor when the load on the motor exceeds a predetermined value. It comprises means (D1, DZ, R1, R2) transforming the voltage variation at the phase-shifting capacitor terminals corresponding to a specific torque variation into a selected voltage variation whatever the maximum torque developed, means comparing (T1) the transformed voltage (UB) with a reference voltage and means for stopping the motor when the transformed voltage is less than the reference voltage.

18 Claims, 3 Drawing Sheets

US 6,795,284 B2

DEVICE FOR STOPPING A SINGLE-PHASE ASYNCHRONOUS MOTOR WITH PHASE-SHIFTING CAPACITOR

BACKGROUND OF THE INVENTION

The subject of the invention is a stopping device for a single-phase asynchronous motor with phase shifting capacitor using the variation in the voltage across the terminals of the phase shifting capacitor as a function of the motor speed itself varying with load, so as to stop the motor when the load on the motor exceeds a specified value.

PRIOR ART

Such a device is described in patent FR 2 649 260. This device comprises a circuit delivering a DC voltage homothetic to the voltage across the terminals of the phase shifting capacitor of the motor, a circuit delivering at least one constant reference voltage and a comparator circuit comparing these two voltages and delivering a stop signal when the homothetic DC voltage becomes equal to or less than the reference voltage.

Such a circuit is especially useful as safety device for stopping the motor of an installation in which the load driven by the motor is at risk of encountering an obstacle with the attendant risks of damage or impairment of the installation. Motorized shutters, blinds and doors may be mentioned by way of example.

A similar device is described in patent EP 0 551 053. This device furthermore comprises means of compensation for taking account of the fluctuation of the voltage across the terminals of the phase shifting capacitor with the temperature of the motor. In the above device the reference voltage consists preferably of a voltage slaved to the voltage of the power supply so as to circumvent fluctuations of this voltage.

In the two devices according to the prior art, the measured voltage is applied to a transformer followed by a rectifier circuit before being applied to one of the inputs of a comparator circuit, the transformation ratio being substantially equal to 30.

Now, in practice, such devices may prove to be incapable of detecting a variation in torque with satisfactory sensitivity and precision. This stems from the fact that in an asynchronous motor with phase shifting capacitor, the voltage across the terminals of the capacitor is substantially constant regardless of the characteristic of the motor. This voltage is substantially 560V when the motor is not subjected to any load and 460V when the motor is locked, that is to say loaded to its maximum torque. The total variation in the voltage across the terminals of the capacitor is therefore 100V and this variation is substantially linear. Thus, if one wishes to detect a variation in torque of 1N, for a motor developing a maximum torque of 4N, the variation in voltage across the terminals of the capacitor will be 100V/4, that is to say 25V, while for a motor developing a maximum torque of 40N the variation in voltage across the terminals of the capacitor will be 100V/40, that is to say 2.5V.

Considering the transformation ratio of the transformer to be 30, one therefore obtains, across the terminals of the capacitor, for a torque variation of 1N a voltage variation substantially equal to 25V/30=0.8V for a motor developing a torque of 4N and a voltage variation substantially equal to 2.5V/30=0.08V for a motor developing a torque of 40N. This latter value may prove to be totally insufficient to detect with satisfactory sensitivity and precision a rise in torque which must necessarily cause the stoppage of the motor.

The aim of the invention is to remedy this drawback.

SUMMARY OF THE INVENTION

The stopping device according to the invention is characterized in that it comprises means for transforming the variation in the voltage across the terminals of the phase shifting capacitor corresponding to a torque variation of 1N into a chosen variation of the voltage regardless of the maximum power of the motor, means for comparing this chosen variation with a reference voltage and means for stopping the motor when the transformed voltage is less than the reference voltage.

According to one mode of execution of the invention, the means for transforming the voltage comprise a voltage rectifier, a voltage reducer and a voltage divider to which is applied the voltage obtained after the voltage reducer.

The voltage reducer preferably consists of a Zener diode, which constitutes the ideal means of achieving a voltage drop. The voltage drop could however be obtained by means of an ad hoc circuit.

The divided voltage can be processed by means of an analog circuit or, by sampling, by means of a microprocessor.

For a torque variation of 1N, a voltage variation matched to the processing circuit used and ensuring good sensitivity will be chosen. The only components of the device which have to be matched to the motor are the Zener diode and the value of the resistors of the voltage divider, or even just the value of one of the resistors.

BRIEF DESCRIPTION OF THE DRAWINGS

The appended drawing represents, by way of example, two modes of execution of the invention.

DETAILED DESCRIPTION OF THE PREFERRED EMBODIMENT(S)

Figure 1:
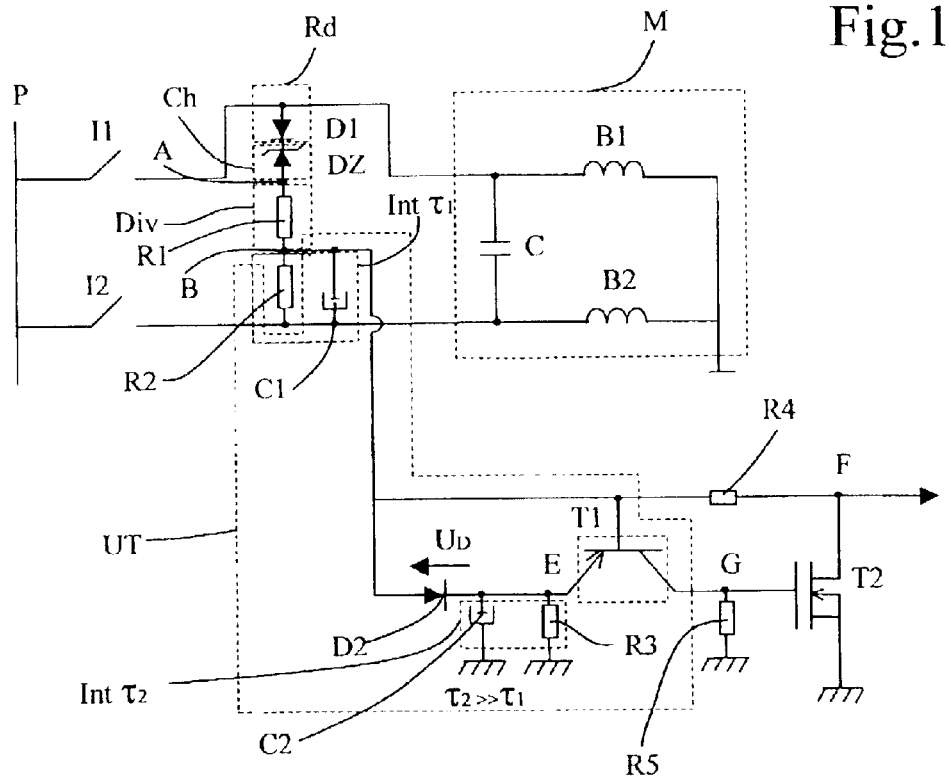
FIG. 1 is the electrical diagram of a mode of execution with analog arrangement.

In FIG. 1, the single-phase motor M is represented as is customary by its two windings B1 and B2 and by its phase shifting capacitor C. This motor is supplied from a single-phase current source P across one or other of the switches I1 or I2. In a well known manner, if the switch I1 is closed the winding B1 constitutes the main winding and B2 the auxiliary winding and the motor turns in one direction, while if the switch I2 is closed it is the winding B2 which plays the role of main winding and the winding B1 the role of auxiliary winding and the motor turns in the other direction.

Between the terminals of the phase shifting capacitor C are wired up in series a diode D1, a Zener diode DZ, a resistor R1 and a resistor R2 in parallel with which a chemical capacitor C1 is wired.

The diode D1 constitutes a voltage rectifier Rd, the Zener diode a voltage reducer Ch and the resistors R1 and R2 a voltage divider Div. As far as R2 and C1 are concerned, they together constitute a first integrator circuit Int exhibiting a time constant τ1. These components are surrounded by a broken thin line in FIG. 1.

The midpoint B of the voltage divider is linked, on the one hand, to the base of a transistor T1 and, on the other hand, to the anode of a diode D2 whose cathode is linked to the emitter of T1, this emitter furthermore being linked to ground through a resistor R3 in parallel with a chemical capacitor C2 constituting a second integrator circuit Int with time constant τ2. These components constitute, with the integrator R2-C1, a processing unit UT. As will be seen later, the transistor T1 constitutes a floating comparator. The collector of the transistor T1 is linked to the gate of a MOS transistor T2 biased by a resistor R5. The source of T2 is linked to ground while its drain is linked to the base of T1 across a resistor R4. It is on this drain, at F, that one obtains the signal controlling the stoppage of the motor when the detected resisting torque exceeds a specified threshold.

The diode D1 eliminates the negative half-waves of the voltage across the terminals of C in such a way as to be able to work ultimately with a quasi-DC current at the level of the processing unit.

The essential components of the circuit are the voltage reducer and the divider. To illustrate their role we shall examine two motors of substantially different power.

Consider a first motor developing a maximum torque of 8N. When its resisting torque varies from 0 to 8N, the voltage across the terminals of its capacitor C varies from 560V to 460V. The voltage drop is therefore 100V. For a torque variation of 1N the voltage variation is therefore equal to 12V. Now, at the level of the processing unit, the maximum voltage at B is desired to be 25V and the voltage variation is desired to be 1V for 1N. The ratio of the voltage divider R1/R2 must therefore be equal to 11. The maximum voltage at the point A must therefore be equal to 25V×11= 275V. By means of a Zener diode DZ exhibiting a Zener voltage of 285V, the maximum voltage at the point A is consequently reduced to 275V.

In the second case, the motor develops a maximum torque of 50N. When the torque varies from 0 to 50N, the voltage drop across the terminals of C is the same as before. For a variation in the torque of 1N, there is therefore in this case a voltage variation of 2V across the terminals of C. The ratio of the resistances of the divider R1/R2 must therefore be equal to 1 and the maximum voltage at A must be equal to 25V×2=50V. The diode DZ must therefore exhibit a Zener voltage equal to 510V.

Thus, regardless of the max torque developed by the motor, it will be possible to obtain a variation of 1V for 1N at the point B by using a Zener diode exhibiting the appropriate Zener voltage and by matching the division ratio of the voltage divider.

Figure 2:
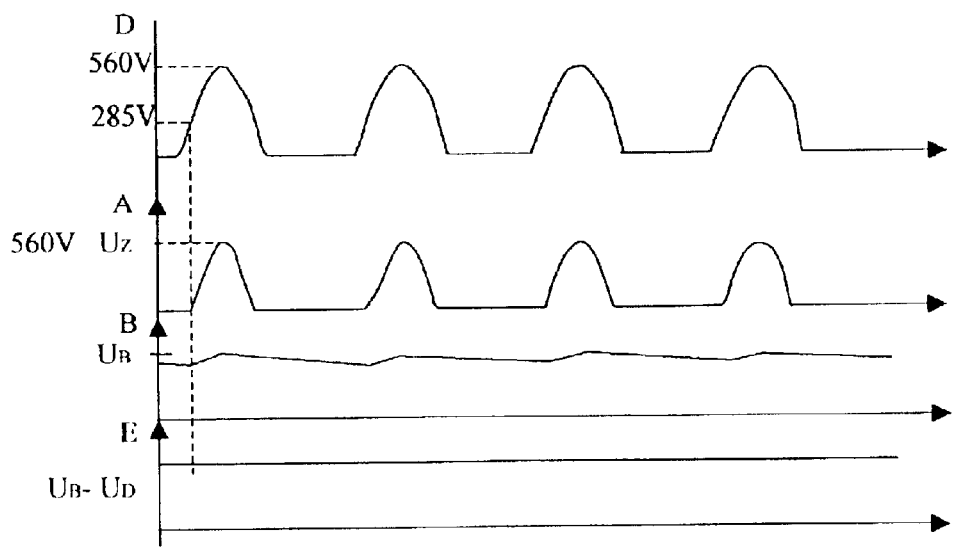
FIG. 2 represents the shape of the voltages at the points A, B and E of the circuit according to FIG. 1.

So as to be able to be used by the analog arrangement of the processing unit UT, the voltage at the midpoint of the divider is integrated by the first integrator R2-C1. The voltage at the point B is the voltage which is the image of the torque. It has the shape represented at B in FIG. 2. This voltage is, on the one hand, applied to the base of the transistor T1, and, on the other hand, it is used to create a reference voltage at the point E, that is to say on the emitter of T1. For this purpose it is applied across the diode D1 to the integrator C2-R3 whose time constant, that is to say the discharge constant τ2 is x times greater than τ1, x being much larger than 1. The diode D2 separates the integrator C2-R3 from the integrator C1-R2 by preventing the capacitor C2 from discharging across R2. We then have $U_B=U_E+U_D$ where $U_D$ is the voltage drop on the diode D2 when off, hence $U_E=U_B-U_D$. The reference voltage remains practically constant as long as there is a voltage at B.

As long as the torque image voltage applied to the base of T1 has not fallen below the reference value, that is to say the critical or threshold value, T1 is off and the voltage at the point G1 of its collector is equal to 0V. If the torque image voltage falls below the critical threshold, T1 comes on and the current across R5 creates a voltage at G greater than 0V. T2 comes on and a stop signal appears at the point F.

The signal at the output F can be processed in any known manner. The voltage obtained at the midpoint of the divider R1/R2 can be processed digitally by means of a microprocessor µP, as represented diagrammatically in FIG. 3. The microprocessor must be equipped with an analog/digital converter. Sampling is preferably employed, as illustrated by FIG. 4. The peak value of the voltage $U_B$ is detected every 20 ms for example. As long as the peaks in the half-waves are decreasing (this signifying that the resisting torque is increasing), or are equal, the difference of the peak values between half-waves nt4 and n is measured. If this value, that is to say the slope of the straight line x, exceeds a given threshold, the motor is stopped.

If a peak value of a half-wave is greater than the previous one, the calculation is restarted at "0", since this implies that the resisting torque is decreasing. It would of course be possible to measure between n+3 and n or n+5 and n, etc.

It is common for the shutter of a roller blind to consist of stackable perforated slats. During an operation for raising a completely closed blind such as this, initially the load opposing the motor increases progressively: the slats become destacked and simultaneously the suspended load and the winding diameter increase as winding proceeds. Then the destacking reaches the bottom slat, the so-called load rail, which is generally highly ballasted: there is then a spike in the torque, which must not be interpreted as an obstacle or an abutment by the detection device. It is possible to avoid this drawback by temporarily adding one or more resistive elements in parallel with one of the resistors R1 or R2 of the voltage divider, in such a way as to modify the sensitivity and the floating preset of the device during the critical startup phase.

Figure 5:
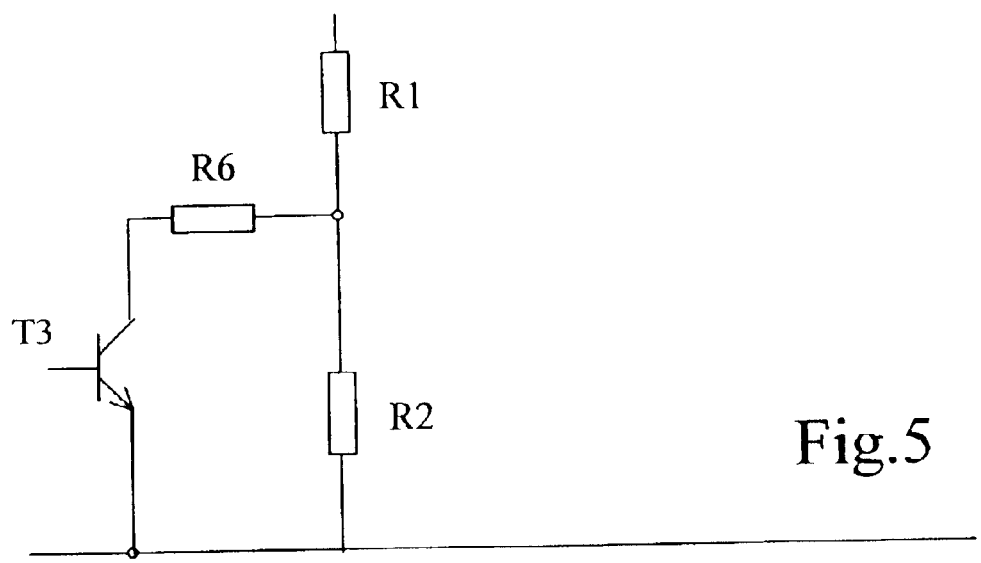
FIG. 5 partially represents a variant of the above modes of execution.

FIG. 5 illustrates one way of achieving this variant execution. Only the resistors R1 and R2 of the voltage divider from the circuits represented in FIGS. 1 and 3 have been represented here. The modification consists in adding a transistor T3, here in parallel with R2, and a resistor R6 wired up between the collector of the transistor T3 and the midpoint of the voltage divider R1/R2. The transistor T3 operates as a switch controlled by a voltage applied to its base. T3 is controlled by a timer during the energizing of the device.

During energizing, the transistor T3 is on and the resistor R6 is then in parallel with R2. A first reference voltage level is recorded by the capacitor C2. At the end of a fixed duration, T3 is turned off by the timer, this having the effect of disconnecting R6. This results in a simultaneous increase in the two voltages, input and floating comparator, and the latter does not react. Conversely, the reference voltage takes a new value which approximates the voltage corresponding to the normal torque of the motor during operation.

It is possible to further refine this improvement by placing a second transistor and an additional resistor in parallel with the previous elements.

Figure 3:
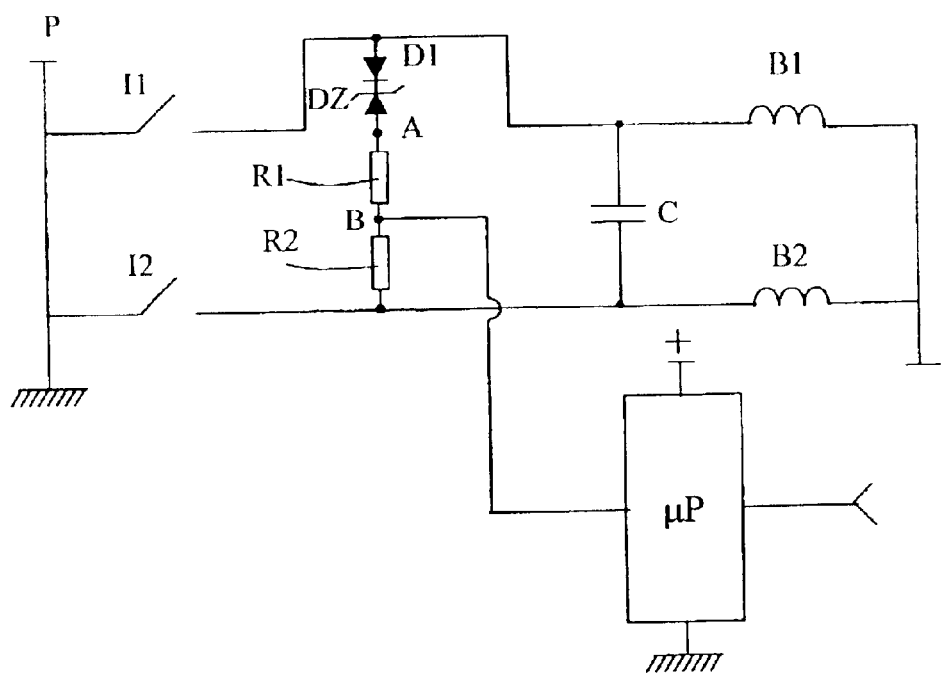
FIG. 3 represents a mode of execution with microprocessor therefore using analog/digital conversion.
Figure 4:
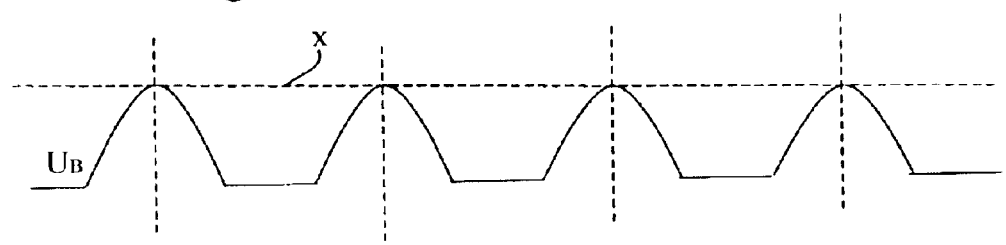
FIG. 4 illustrates the mode of measurement by sampling of the mode of execution represented in FIG. 3.

In the case of the diagram of FIG. 3, the transistor T3 could be operated directly by the microprocessor.

This modification, which would be totally unnecessary if the motors were to start under constant load, makes it possible in one or more successive tiers to reach the operating zone whose sensitivity is tuned to the nominal torque of the motor.

The placing of one or more resistive elements in parallel with one of the resistors R1 or R2 of the voltage divider could be carried out during other critical operating phases of the motor.

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A stopping device for a single-phase asynchronous motor with phase shifting capacitor (C) using the variation in the voltage across the terminals of this capacitor as a function of the motor speed itself varying with load, so as to stop the motor when the load on the motor exceeds a specified value, characterized in that it comprises means (D1, DZ, R1, R2) for transforming the variation in the voltage across the terminals of the phase shifting capacitor corresponding to a specified torque variation into a chosen variation of the voltage regardless of the maximum torque developed by the motor, means (T1) for comparing the transformed voltage ($U_B$) with a reference voltage ($U_B-U_D$) and means for stopping the motor when the transformed voltage is less than the reference voltage.

2. The stopping device as claimed in claim 1, characterized in that the means for transforming the voltage comprises a voltage rectifier (D1), a voltage reducer (DZ) and a voltage divider (R1, R2) to which is applied the voltage obtained after the voltage reducer.

3. The stopping device as claimed in claim 2, characterized in that the voltage reducer is a Zener diode.

4. The stopping device as claimed in claim 3, characterized in that it comprises a first integrator (R2, C1) to which is applied the voltage divided ($U_B$) by the voltage divider, this first integrator delivering a voltage which is the image of the torque, a second integrator (R3, C2) providing a reference voltage ($U_B-U_D$) on the basis of the voltage which is the image of the torque, a floating comparator (T1) to which are applied the voltage which is the image of the torque and the reference voltage and an output stage (T2) delivering a stop signal when the voltage which is the image of the torque is less than the reference voltage.

5. The stopping device as claimed in claim 4, characterized in that the floating comparator comprises a transistor (T1).

6. The stopping device as claimed in claim 1, characterized in that it comprises a microprocessor for the digital processing of the transformed and divided voltage.

7. The stopping device as claimed in claim 6, characterized in that the microprocessor measures the difference between the peak values of the divided voltage ($U_B$) between half-wave n+m and n, where m is a specified and invariable integer number, while the peak values are decreasing or are equal and stops the motor when this difference exceeds a given threshold, and in that the microprocessor restarts the calculation at zero when a peak value is greater than the previous one.

8. The stopping device as claimed in claim 1, characterized in that it comprises means for modifying the transformed voltage during at least one critical operating phase.

9. The stopping device as claimed in claim 8, in which the means for transforming the voltage comprises a voltage divider ($R_1$, $R_2$), characterized in that the means for modifying the transformed voltage consist of means for placing at least one resistor (R6) in parallel with one of the resistors (R1, R2) of the voltage divider.

10. The stopping device as claimed in claim 9, characterized in that the means for placing in parallel comprises a transistor (T3) controlled by a timer or by the microprocessor.

11. The stopping device as claimed in claim 2, characterized in that it comprises a microprocessor for the digital processing of the transformed and divided voltage.

12. The stopping device as claimed in claim 3, characterized in that it comprises a microprocessor for the digital processing of the transformed and divided voltage.

13. The stopping device as claimed in claim 2, characterized in that it comprises means for modifying the transformed voltage during at least one critical operating phase.

14. The stopping device as claimed in claim 3, characterized in that it comprises means for modifying the transformed voltage during at least one critical operating phase.

15. The stopping device as claimed in claim 4, characterized in that it comprises means for modifying the transformed voltage during at least one critical operating phase.

16. The stopping device as claimed in claim 5, characterized in that it comprises means for modifying the transformed voltage during at least one critical operating phase.

17. The stopping device as claimed in claim 6, characterized in that it comprises means for modifying the transformed voltage during at least one critical operating phase.

18. The stopping device as claimed in claim 7, characterized in that it comprises means for modifying the transformed voltage during at least one critical operating phase.

* * * * *